United States Patent
Swanson et al.

(10) Patent No.: US 10,066,954 B1
(45) Date of Patent: Sep. 4, 2018

(54) PARKING SUGGESTIONS

(71) Applicant: Spotify AB, Stockholm (SE)

(72) Inventors: Christopher Swanson, Stockholm (SE); Johan Oskarsson, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 15/721,180

(22) Filed: Sep. 29, 2017

(51) Int. Cl.
*G01C 21/34* (2006.01)
*G01C 21/36* (2006.01)
*G08G 1/14* (2006.01)

(52) U.S. Cl.
CPC ..... *G01C 21/3484* (2013.01); *G01C 21/3415* (2013.01); *G01C 21/3691* (2013.01); *G08G 1/141* (2013.01)

(58) Field of Classification Search
CPC ........... G01C 21/3484; G01C 21/3415; G01C 21/3691; G01C 21/3685; G08G 1/141; G07B 15/02; B60Q 1/00; H04W 48/04
See application file for complete search history.

(56) References Cited

U.S. PATENT DOCUMENTS

| | | | |
|---|---|---|---|
| 9,378,601 B2* | 6/2016 | Ricci | B60Q 1/00 |
| 9,547,988 B2* | 1/2017 | Moore | G01C 21/3685 |
| 2012/0285790 A1* | 11/2012 | Jones | G07B 15/02 |
| | | | 194/217 |
| 2014/0309789 A1* | 10/2014 | Ricci | B60Q 1/00 |
| | | | 700/276 |
| 2014/0309864 A1* | 10/2014 | Ricci | H04W 48/04 |
| | | | 701/36 |

OTHER PUBLICATIONS

Kokolaki et al., Value of information exposed: Wireless networking solutions to the parking search problem, 2011, IEEE, p. 187-194 (Year: 2011).*
Verroios et al., Reaching Available Public Parking Spaces in Urban Environments Using Ad Hoc Networking, 2011, IEEE, pg. p. 141-151 (Year: 2011).*
Rhodes et al., Smart Routing: A Novel Application of Collaborative Path-Finding to Smart Parking Systems, 2014, IEEE, p. 119-126 (Year: 2014).*
Lambrinos et al., DisAssist: An internet of things and mobile communications platform for disabled parking space management, 2013, IEEE, p. 2810-2815 (Year: 2013).*

* cited by examiner

*Primary Examiner* — McDieunel Marc
(74) *Attorney, Agent, or Firm* — Merchant & Gould P.C.

(57) ABSTRACT

Systems, devices, apparatuses, components, methods, and techniques for navigating a vehicle to a recommended parking area are provided. A method of navigating a vehicle to a parking space includes determining a destination, determining a best available parking space, and routing the vehicle to the best available parking space. Available parking spaces are determined by accessing data for parking facilities, parking meters, and GPS data of other vehicles. The best parking spaces are determined by user preferences that include one or more of distance from destination, cost of parking, and availability of particular types of parking spaces. The method further includes providing media content in the vehicle during navigation to the best available parking space.

27 Claims, 13 Drawing Sheets

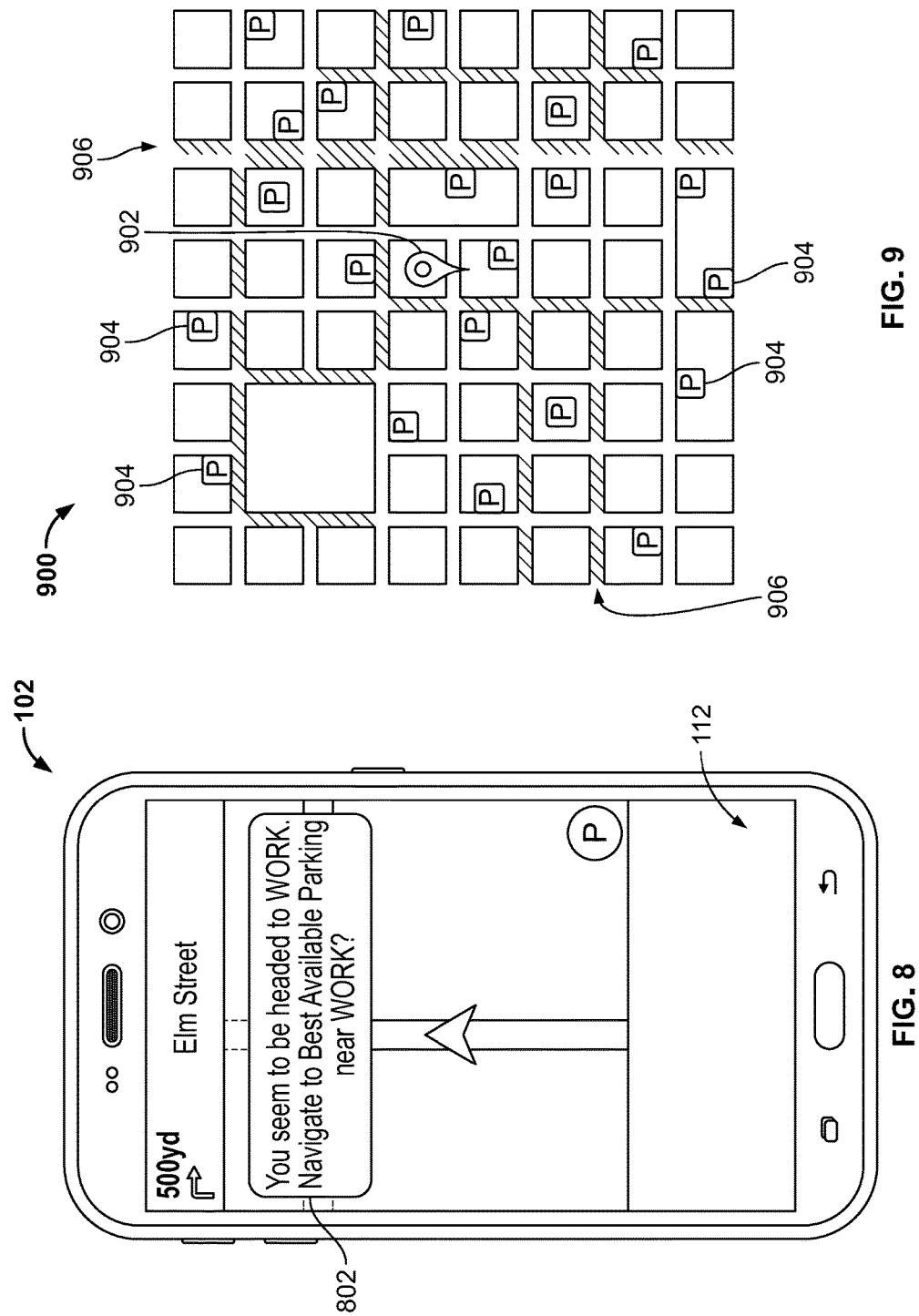

Parking Preferences

Distance from Destination — 1402
- As close as possible! (<0.2mi)
- Within reason (0.5mi)
- I love walking! (>1mi)

Cost of Parking — 1404
- Better be Free!
- Within Reason
- Money is no object

Covered Parking — 1406
- Not important
- Only in bad weather
- Must have

Secured Parking — 1408
- Not important
- Preferably, but not essential
- Must have Payment Accepted: — 1410
- ☐ Cash
- ☒ Credit Card
- ☐ City Prepaid Parking Card Accessibility: — 1412
- ☐ Parking Pass for [Facility Name or Address]
- ☐ Disability Parking Certificate

FIG. 14

Available Parking Options: 1500, 1504

| | |
|---|---|
| First National Bank Tower Garage | 99% |
| 6th Ave Paid Lot | 97% |
| 5th Ave Metered Street Parking | 94% |
| Myrtle Parking Lot | 91% |
| Public Parking Ramp A | 86% |
| ABC Tower Ramp | 85% |
| Walnut St Metered Street Parking | 83% |
| Public Parking Ramp B | 75% |

1502

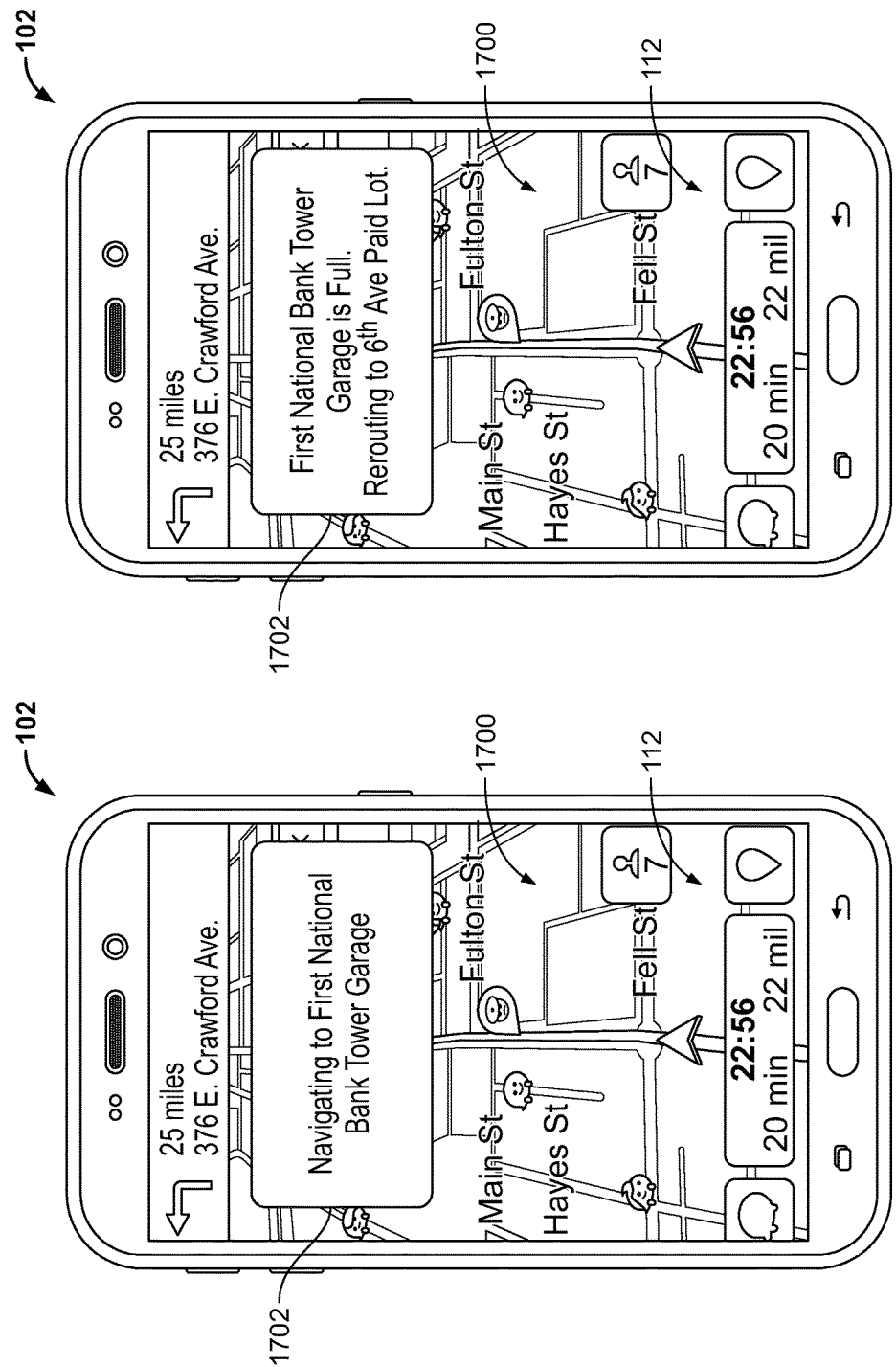

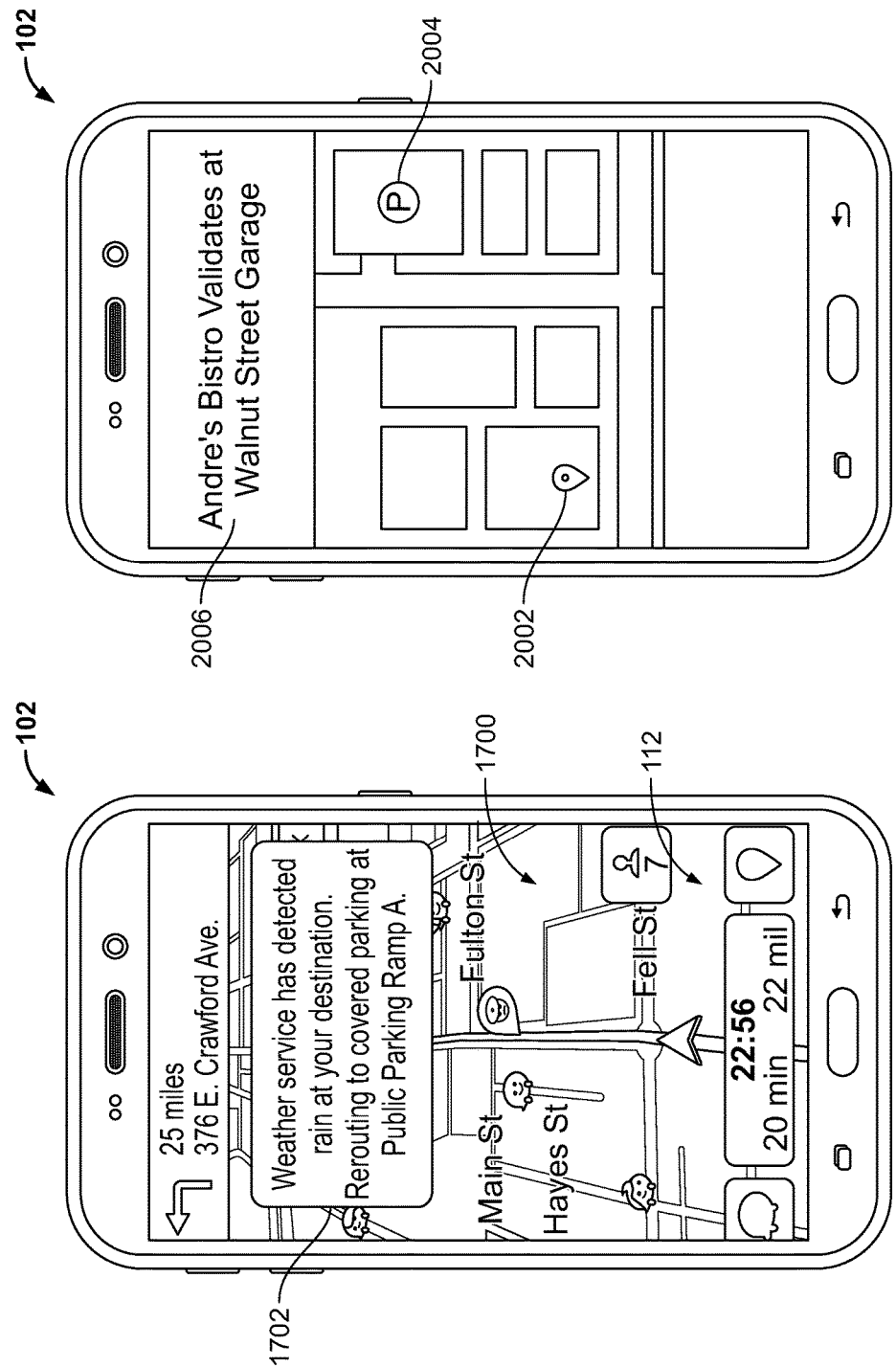

PARKING SUGGESTIONS

BACKGROUND

One of the challenges of traveling by driving a personal vehicle is finding places to park one's vehicle. Multiple websites, computing applications, and other inventions have been developed to try to make it easier for drivers to find parking close to their desired destinations. Many drivers use computing devices such as mobile phones to play music and other media content in their vehicle while they are driving. Additionally, many drivers rely on GPS navigation provided by their computing devices to assist them in navigating to their destination.

SUMMARY

In general terms, this disclosure is directed to systems and methods of providing parking suggestions to a user driving a vehicle. In one possible configuration and by non-limiting example, a computing device provides navigation instructions to the user while playing music. Either before or during navigation, parking recommendations are made to the user and the system navigates the user to the best available parking area near to the user's destination. Various aspects are described in this disclosure, which include, but are not limited to, the following aspects.

In one aspect, a method of navigating a vehicle to a parking space comprises determining a destination to which the vehicle is travelling. A best available parking space for the destination is determined by locating all parking areas within a predefined distance of the destination that have vacant parking spaces and ranking the parking areas based on user preferences of the person driving the vehicle. Then the vehicle is routed to the best available parking space.

In another aspect, a computing device for navigating a vehicle to a parking space comprises a processor, a location determining device, an output device and a memory device. The output device is configured to play media content items during navigation. The memory device encodes instructions that, when executed by the processor cause the computing device to determine a destination, determine a best available parking space, and route the vehicle to the best available parking space. The best available parking space is determined by locating all parking areas within a predefined distance of the destination, determining which parking areas have vacant parking spaces, ranking the parking areas, and selecting a parking area.

In yet another aspect, a system for navigating a vehicle to a parking space comprises a media server configured to communicate with a media playback device through a network. The media server comprises a media server application for accessing and streaming media content, a parking application for determining a best available parking area, a navigation application for determining a route of the vehicle, a processing device, and a memory device. The memory device encodes instructions that, when executed by the processor cause the media server to receive a selection of a destination, determine a best available parking space for the destination, and send instructions to the media playback device to route the vehicle to the best available parking space.

In another aspect, computer-executable instructions are executed by one or more computing devices, causing the computing device to receive input of a destination and locate all parking areas within a predefined distance of the destination. The computing device then determines which parking areas have vacant parking spots by accessing one or more of parking facility data, parking meter data, and GPS data of other vehicles. The vacant parking spaces are ranked based on one or more of distance, cost, user defined preferences, and preferences of other users traveling to the same destination. The best available parking space is selected and navigation instructions are provided to the best available parking space.

BRIEF DESCRIPTION OF THE DRAWINGS

FIG. 8 illustrates another embodiment of the user interface of the computing device of FIG. 2 implementing the method of FIG. 5.

FIG. 9 is a map visualization used in an embodiment of the method of FIG. 5.

FIG. 14 illustrates an example display of parking preferences displayed on the computing device of FIG. 1.

FIG. 17 shows an example display of the computing device of FIG. 2 implementing the method of FIG. 5.

FIG. 18 shows an example display of the computing device of FIG. 2 implementing the method of FIG. 5.

FIG. 19 illustrates an embodiment of the user interface of the computing device of FIG. 2 implementing a variation of the method of FIG. 5.

FIG. 20 shows an example display on the user interface of the computing device of FIG. 2.

DETAILED DESCRIPTION

Figure 1:
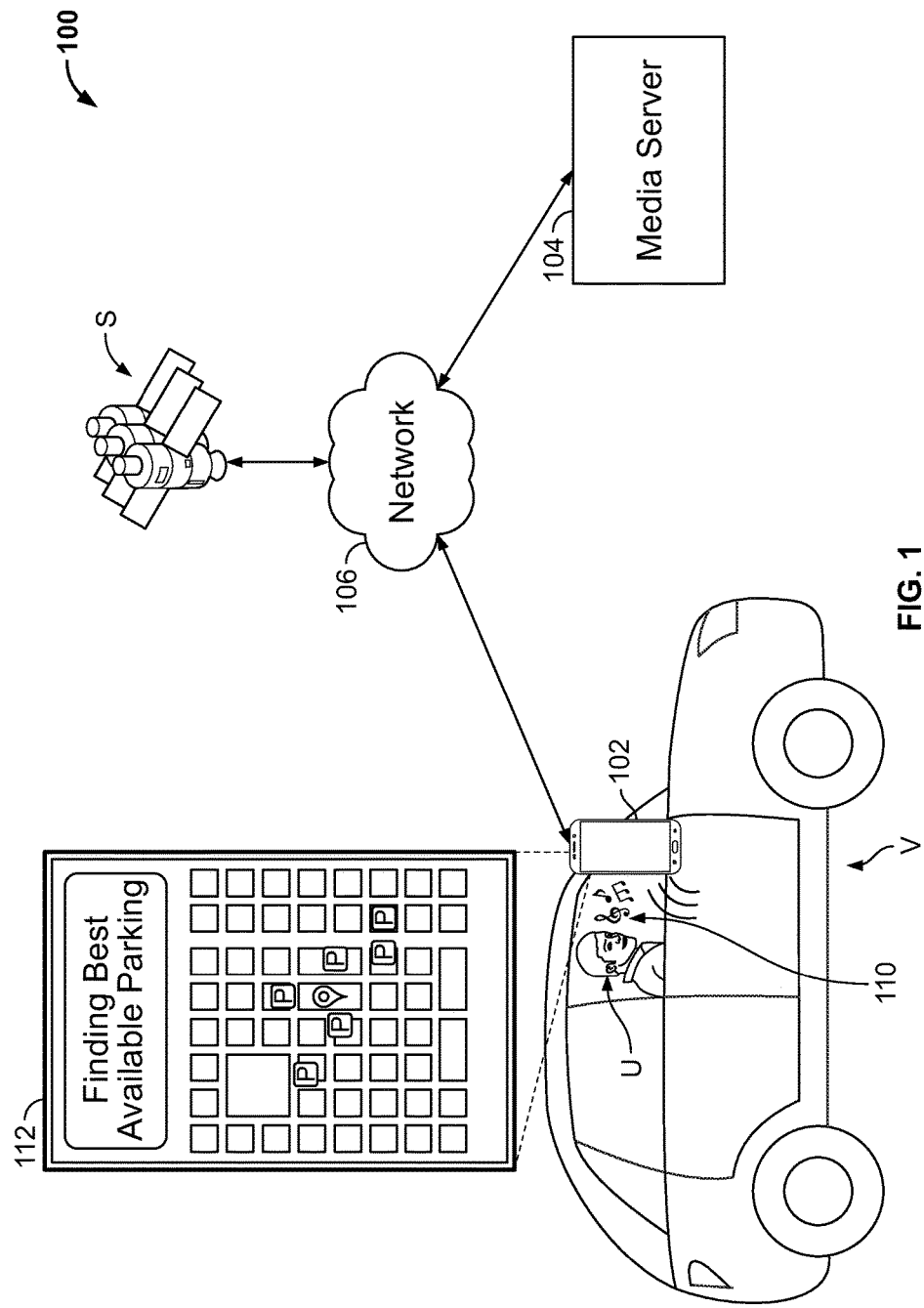
FIG. 1 illustrates an example system for navigating to a recommended parking area.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Many people utilize computing devices while traveling by vehicle. For example, a computing device could be a mobile computing device such as a smartphone or tablet. In another example, a computing device could be built into a vehicle's dash-mounted infotainment system. Computing devices are often utilized while driving to provide navigation instructions or to play media content for people to listen to while traveling. However, separate applications are generally required for playing music, navigating, and other functions.

One of the problems with traveling by vehicle is finding places to park. In particular, it can be difficult to determine where parking spaces are available nearby a particular destination. The destination may be someplace new that a user is unfamiliar with or may be a common destination, such as the user's workplace. For a new destination, the user may not be aware of available parking options nearby. For a familiar destination, if the user's usual parking area is full, the user may not know what the next best alternative is for parking. Embodiments disclosed herein address some or all of these challenges.

An integrated system for providing navigation, music, and parking suggestions is described herein. A user can access directions to recommended parking areas near a chosen destination while listening to media content. All of this can be done within the same application on a user's computing device, eliminating the need to access multiple different applications. By integrating these essential functions into one system, the user can access important information while listening to music and driving. This is beneficial because less interaction is required with the computing device, reducing the distractions for the driver.

FIG. 1 illustrates an example system 100 for navigating to a recommended parking area. The recommended parking area is generally located near to a particular destination to which a user U is traveling. The example system 100 includes a computing device 102 and a media server 104. The computing device 102, in some embodiments, operates to provide media content playback to the user U travelling in a vehicle V. In some embodiments, the computing device 102 operates to provide navigation instructions and parking recommendations to the user U. In some embodiments, the computing device 102 also provides weather information to the user U. The system 100 communicates across a network 106. Also shown are satellites S which provide global positioning signals to the media-playback device 102 and media server 104 through the network 106.

The user U may interact with a user interface 112 on the computing device 102 to navigate the vehicle V, receive parking recommendations, and listen to media output 110. Although the computing device 102 is shown as a separate device in FIG. 1, the computing device 102 can also be integrated with the vehicle V (e.g., as part of a dash-mounted vehicle infotainment system).

The computing device 102 plays back media content items to produce media output 110. In some embodiments, the media content items are provided by the media server 104 and transmitted to the computing device 102 using the network 106. A media content item is an item of media content, including audio, video, or other types of media content, which may be stored in any format suitable for storing media content. Non-limiting examples of media content items include news content items, weather content items, traffic content items, music, audiobooks, music videos, movies, television episodes, podcasts, other types of audio or video content, and portions or combinations thereof.

The computing device 102 plays media content for the user during travel or other activities. The media content that is played back may be selected based on user input or may be selected without user input. The media content may be selected for playback without user input by either the computing device 102 or the media server 104. For example, media content can be selected for playback without user input based on stored user profile information, location, travel conditions, current events, and other criteria.

The computing device 102 is also configured to provide navigation instructions to the user U traveling in the vehicle V. The computing device 102 accesses GPS information about the user's current location and accesses traffic information to provide navigation assistance to the user U. In some embodiments, the user U selects a destination before starting to travel and follows turn-by-turn navigation instructions to arrive at the selected destination. In other embodiments, the computing device 102 may not be instructed to provide navigation instructions, but can still provide route information such as traffic conditions. In other embodiments, the computing device 102 can learn typical routes of the user U and automatically detect a destination to which a user is traveling.

The computing device 102 can also provide parking suggestions to the user U traveling in the vehicle V. If the user U is traveling to a specified destination, the computing device 102 can suggest parking options available near the destination. In some instances, the computing device 102 automatically selects the best available parking near the user's destination. In some embodiments, the computing device 102 learns a user's preferred parking area near a particular destination, such as a preferred parking lot near the user's workplace, and can determine if the user's preferred parking area has available spaces. If the user's preferred parking area does not have available parking spaces, the computing device 102 provides recommendations for the next best available parking. In other instances, the user U requests to find parking near his or her current location and the computing device 102 provides recommendations for the best available parking near the user U.

In some embodiments, the computing device 102 communicates with traffic data sources and weather data sources to provide reports and guidance for parking recommendations and navigation. In some embodiments, the computing device 102 outputs reports about current traffic and/or weather conditions for the geographic area that the user is driving in and/or the geographic area of the user's destination. The reports can be provided at times that are least disruptive to media playback on the computing device 102. In some embodiments, the computing device 102 accesses traffic and weather data to inform the parking recommendations that are made to the user. For example, if it is raining, the computing device 102 might recommend a parking area near the user's destination that is covered.

Figure 2:
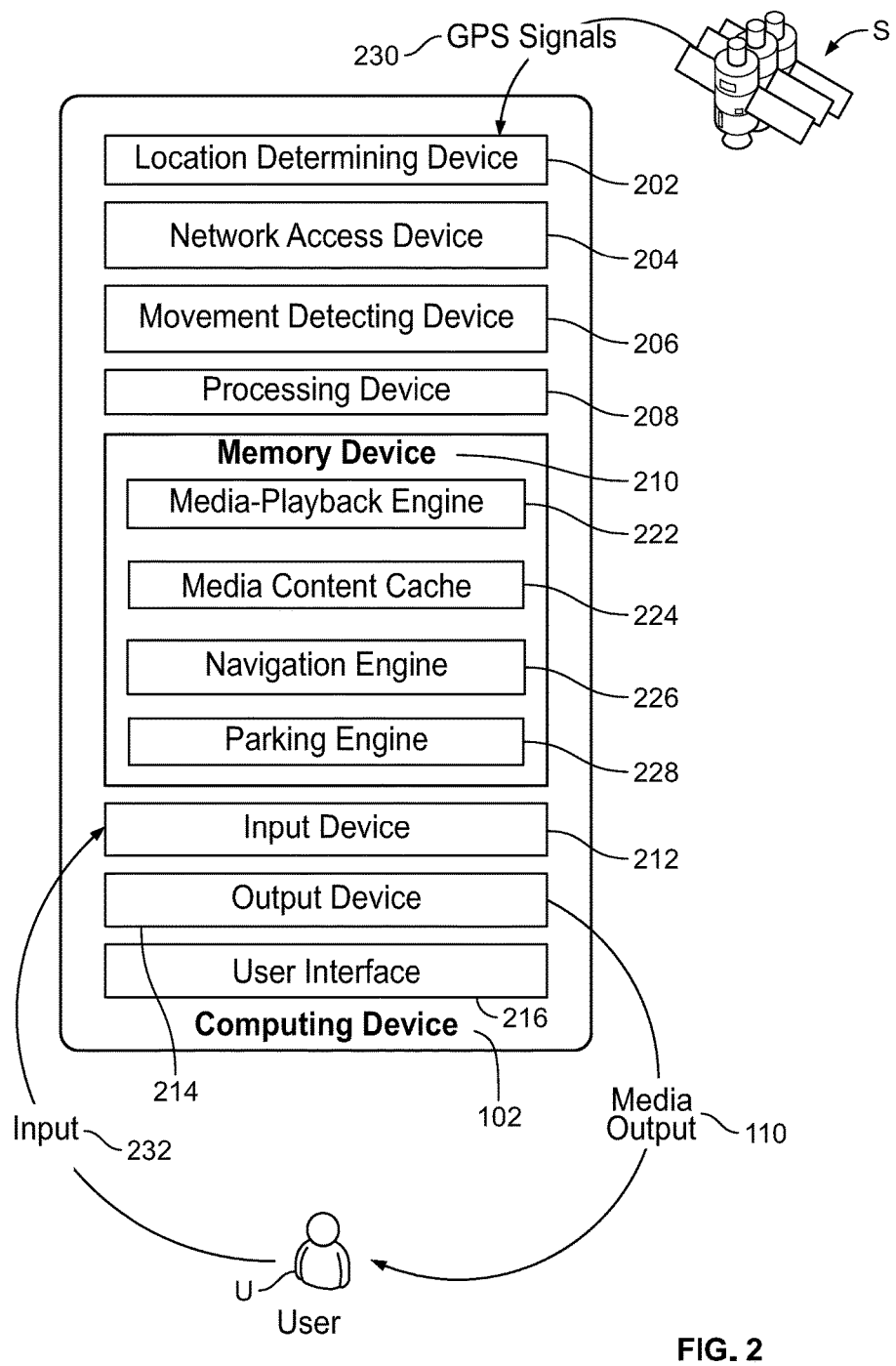
FIG. 2 is a schematic illustration of the media-playback device of FIG. 1.

FIG. 2 is a schematic illustration of a computing device 102. In this embodiment, the media-playback device 102 includes a location determining device 202, a network access device 204, a movement-detecting device 206, a processing device 208, a memory device 210, an input device 212, an output device 214, and a user interface 112. Also shown are the user U and satellites S.

The computing device 102 plays media content items. In some embodiments, the computing device 102 plays media content items that are provided (e.g., streamed, transmitted, etc.) by a system external to the computing device 102 such as the media server 104, another system, or a peer device. Alternatively, in some embodiments, the computing device 102 plays media content items stored locally on the computing device 102. Further, in at least some embodiments, the computing device 102 plays media content items that are stored locally as well as media content items provided by other systems.

The computing device 102 also provides navigation instructions and parking suggestions. The computing device 102 displays navigation instructions on the output device 214 and can optionally provide verbal instructions to a user. In some embodiments, the computing device 102 outputs parking recommendations near a destination. The parking recommendations may be provided automatically or may be requested by the user. In some embodiments, the computing device 102 outputs information about weather and traffic conditions. The weather and traffic may be taken into account when providing parking recommendations.

In some embodiments, the computing device 102 is a media-playback device, handheld entertainment device, smartphone, tablet, watch, wearable device, or any other type of device capable of playing media content. In yet other embodiments, the computing device 102 is an in-dash vehicle computer, laptop computer, desktop computer, television, gaming console, set-top box, network appliance, blue-ray or DVD player, media player, stereo, or radio.

The location determining device 202 is a device that determines the location of the computing device 102. The location of the computing device 102 is utilized to provide navigation instructions as well as to determine a user's location relative to a destination and/or a parking area. In some embodiments, the location determining device 202 uses one or more of the following technologies: Global Positioning System (GPS) technology which may receive GPS signals 230 from satellites S, cellular triangulation technology, network-based location identification technology, Wi-Fi positioning systems technology, and combinations thereof.

The network access device 204 operates to communicate with other computing devices over one or more networks, such as the network 106. The other computing devices can provide data from external sources that is utilized to provide parking suggestions. Examples of the network access device 204 include one or more wired network interfaces and wireless network interfaces. Examples of wireless network interfaces include infrared, BLUETOOTH® wireless technology, 802.11a/b/g/n/ac, and cellular or other radio frequency interfaces.

The network 106 is an electronic communication network that facilitates communication between the media-playback device 102 and the media server 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more vehicle are networks, local area networks (LANs), metropolitan area networks, subnets, wide area networks (such as the Internet), or can be implemented at another scale. Further, in some embodiments, the network 106 includes multiple networks, which may be of the same type or of multiple different types.

The movement-detecting device 206 senses movement of the computing device 102. In some embodiments, the movement-detecting device 206 also determines an orientation of the computing device 102. In at least some embodiments, the movement-detecting device 206 includes one or more accelerometers or other motion-detecting technologies or orientation-detecting technologies. As an example, the movement-detecting device 206 may determine an orientation of the computing device 102 with respect to a primary direction of gravitational acceleration. The movement-detecting device 206 may detect changes in the determined orientation and interpret those changes as indicating movement of the computing device 102. Movement of the computing device 102 may be interpreted as indicating movement of a vehicle in which the computing device 102 is located. For example, movements can be detected which indicate that a vehicle is currently entering a parking space or exiting a parking space. Alternatively, movements may indicate that a vehicle has started to travel to a destination.

In some embodiments, the processing device 208 comprises one or more central processing units (CPU). In other embodiments, the processing device 208 additionally or alternatively includes one or more digital signal processors, field-programmable gate arrays, or other electronic circuits. The processing device 208 executes instructions stored in the memory device 210.

The memory device 210 operates to store data and instructions. In some embodiments, the memory device 210 stores instructions for a media-playback engine 222. In some embodiments, the media-playback engine 222 selects and plays back media content and generates interfaces for selecting and playing back media content items. The memory device 210 may further store instructions for a navigation engine 226 and a parking engine 228 in some embodiments. The navigation engine 226 operates to determine routes to selected destinations. The parking engine 228 operates to locate the best available parking areas and report the status of available parking spaces near of a location of interest to the user.

Some embodiments of the memory device also include a media content cache 224. The media content cache 224 stores media-content items, such as media content items that have been previously received from the media server 104. The media content items stored in the media content cache 224 may be stored in an encrypted or unencrypted format. The media content cache 224 can also store decryption keys for some or all of the media content items that are stored in an encrypted format. The media content cache 224 can also store metadata about media-content items such as title, artist name, album name, length, genre, mood, era, etc. The media content cache 224 can also store playback information about the media content items, such as the number of times the user has requested to playback the media content item or the current location of playback (e.g., when the media content item is an audiobook, podcast, or the like for which a user may wish to resume playback). In some embodiments, the playlist can be stored in the media content cache 224 for later playback.

The memory device 210 typically includes at least some form of computer-readable media. Computer readable media includes any available media that can be accessed by the computing device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the computing device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The input device 212 receives inputs from a user. The input device 212 is one or more of a keyboard, a touch-screen, a sound-sensing device, and a mouse. The input device 212 may include a sound-sensing device. The sound-sensing device senses sounds proximate the computing device 102 (e.g., sounds within a vehicle in which the computing device 102 is located). In some embodiments, the sound-sensing device comprises one or more microphones. For example, the sound-sensing device may capture a recording of sounds from proximate the computing device 102. These recordings may be analyzed by the computing device 102 using speech-recognition technology to identify words spoken by the user. The words may be recognized as commands from the user that alter the operation of the computing device 102 and the playback of media content by the computing device 102. The words and/or recordings may also be analyzed by the computing device 102 using natural language processing and/or intent-recognition technology to determine appropriate actions to take based on the spoken words.

The output device 214 operates to output visual and audial content. In some embodiments, some output is provided through the user interface 112. In some embodiments, the output device 214 generates media output 110 for the user U. Examples of the output device 214 include a speaker assembly comprising one or more speakers, an audio output jack, a Bluetooth transmitter, a display panel, and a video output jack. Other embodiments are possible as well. For example, the content output device 214 may transmit a signal through the audio output jack or Bluetooth transmitter that can be used to reproduce an audio signal by a connected or paired device such as headphones, speaker system, or vehicle media-playback system.

The user interface 112 operates to receive input 232 from the user U. The user U may provide input to the user interface 216 by the input device 212. The user interface 112 also operates to provide output, which may be generated through the output device 214. The user interface 112 allows for interaction between the user and the computing device 102. In some embodiments the user interface 112 includes displays of menus and options and receives text, verbal, or other touch inputs to receive selections.

The user interface 112 can display maps, navigation, parking information, weather information, user preferences, and other information and displays relevant to operation of the computing device 102. In some embodiments, the user interface 112 is designed to be easy to use while driving, requiring fewer interactions from the driver.

In some embodiments, the input device 212, the output device 214, and the user interface 112 are combined into a touch screen. The touch screen operates to receive an input from a selector (e.g., a finger, stylus, etc.) controlled by the user U. In some embodiments, the touch screen detects inputs based on one or both of touches and near-touches. In some embodiments, single taps and/or swipes are recognized as inputs. In some embodiments, the touch screen displays the user interface 112 for interacting with the computing device 102. As noted above, some embodiments do not include a touch screen. Some embodiments include a display device and one or more separate user interface devices. Further, some embodiments do not include a display device. In some embodiments, the user interface 112 operates to receive input from the user U to determine one or more preferences of the user U.

Figure 3:
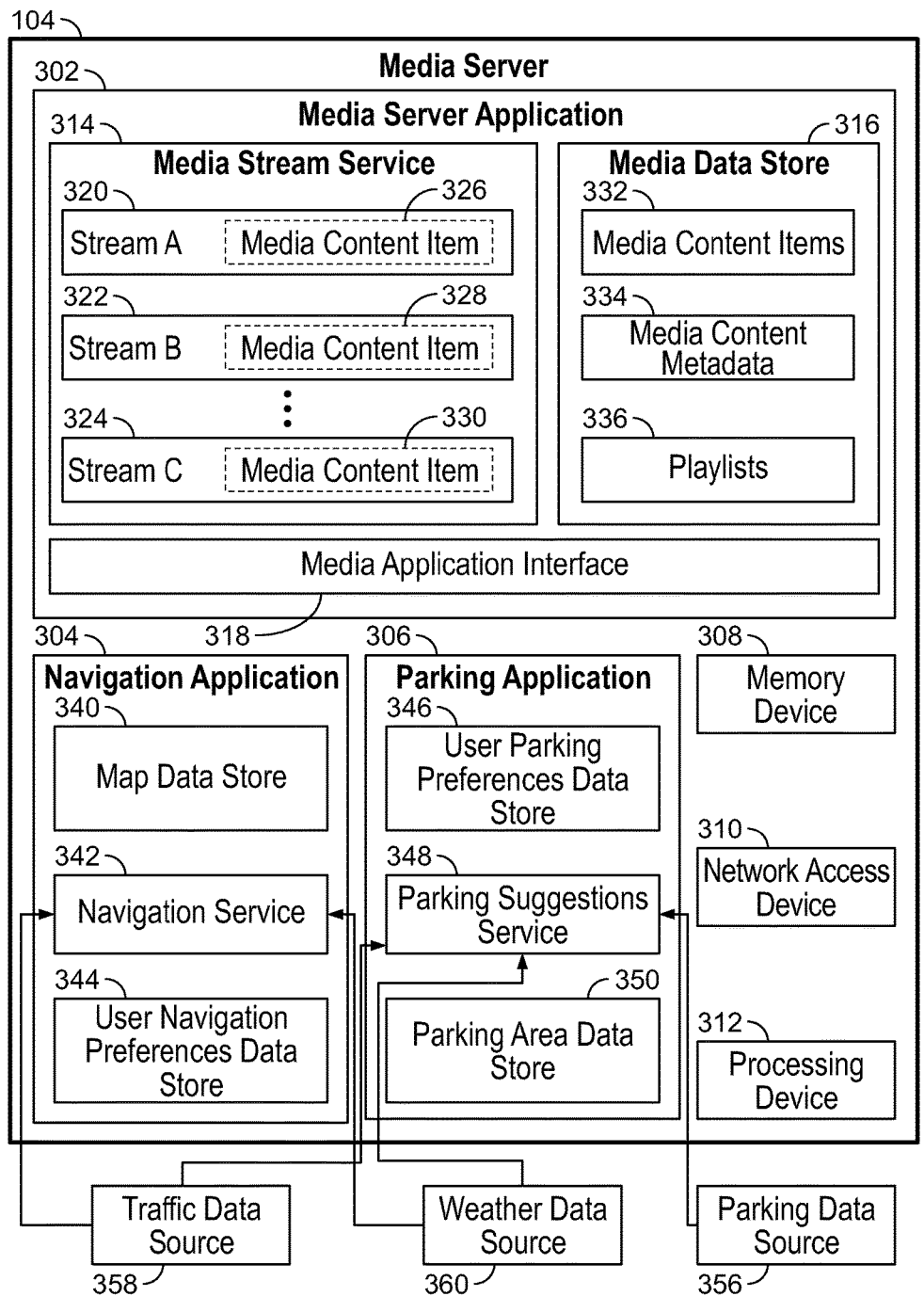
FIG. 3 is a schematic illustration of the server of FIG. 1.

FIG. 3 is a schematic illustration of the media server 104. In the embodiment of FIG. 3, the media server 104 includes a media server application 302, a navigation application 304, a parking application 306, a memory device 308, a network access device 310, and a processing device 312. The media server 104 comprises one or more computing devices and provides media content items to the media-playback device 102 along with navigation instructions and parking suggestions. The processing device 312, memory device 308, and network access device 310 may be similar to the processing device 208, memory device 210, and network access device 204 respectively, which have each been previously described. In some embodiments, the media server 104 communicates with a parking data source 356, a traffic data source 358, and a weather data source 360. While only one of each data source is displayed in FIG. 3, multiple data sources may be accessed by the media server 104.

In some embodiments, the media server application 302 accesses and streams music or other audio, video, or other forms of media content. The media server application 302 includes a media stream service 314, a media data store 316, and a media application interface 318. The media stream service 314 operates to buffer media content such as media content items 326, 328, and 330, for streaming to one or more streams 320, 322, and 324.

The media application interface 318 can receive requests or other communication from media-playback devices or other systems, to retrieve media content items from the media server 104.

In some embodiments, the media data store 316 stores media content items 332, media content metadata 334, and playlists 336. The media data store 316 may comprise one or more databases and file systems. As noted above, the media content items 332 may be audio, video, or any other type of media content, which may be stored in any format for storing media content.

The media content metadata 334 operates to provide various information associated with the media content items 332. In some embodiments, the media content metadata 334 includes one or more of title, artist name, album name, length, genre, mood, era, etc. In some embodiments, the media content metadata 334 includes characteristics about media content relevant to its appropriateness for certain travel conditions. In some embodiments, the media content metadata 334 records information about one or more users' preferences related to a media content item.

The playlists 336 operate to identify one or more of the media content items 332 and assemble the media content items together into a playlist. In some embodiments, the playlists 336 identify a group of the media content items 332 in a particular order. In other embodiments, the playlists 336 merely identify a group of the media content items 332 without specifying a particular order. Some, but not necessarily all, of the media content items 332 included in a particular one of the playlists 336 are associated with a common characteristic such as a common genre, mood, era, or appropriateness for particular travel conditions. The playlists 336 may include user-created playlists, which may be available to a particular user, a group of users, or to the public.

The navigation application 304 provides navigation instructions, map information, and current location information to a user. In some embodiments, the navigation application 304 includes a map data store 340, a navigation service 342, and a user navigation preferences data store 344. The navigation application 304 can receive requests or other communication from computing devices or other systems, to retrieve map information and navigation instructions during travel. For example, in FIG. 2, the navigation application 304 sends and receives communications to and from the computing device 102.

The map data store 340 stores maps, information about businesses and destinations, parking information for businesses, operating hours of businesses, road closure information, construction updates, and other information about destinations and roads.

The navigation service 342 accesses information from map data store 340 and user navigation preferences data store 344 as well as the traffic data source 358 and weather data source 360. The navigation service 342 operates to provide navigation instructions to the computing device 102 providing the fastest, shortest, and/or most direct route to a destination. In some embodiments, the navigation service 342 communicates with one or more of the traffic data source 358 and weather data source 360 to determine the best navigation route for the user.

The user navigation preferences data store 344 includes user preferences such as a preference for avoiding highways or toll roads, saved locations such as home and work, frequently used routes, preferences for route variations, and the like. The user navigation preferences data store 344 is accessed by the navigation service 342 to inform navigation decisions.

The parking application 306 provides parking recommendations to a user traveling in a vehicle based on the user's destination, user preferences, and availability of parking spaces. In some embodiments, the parking application 306 includes a user parking preferences data store 346, a parking suggestions service 348, and a parking area data store 350. The parking application 306 can also communicate with the parking data source 356, the traffic data source 358, and the weather data source 360. The parking application 306 can receive requests or other communication from computing devices or other systems, to retrieve parking information during travel. For example, in FIG. 2, the parking application 306 sends and receives communications to and from the computing device 102.

The user parking preferences data store 346 includes user preferences such as: cost parking, distance of parking from destination, preference for covered or secured parking, saving preferred parking locations, preferred payment type, whether user has a parking pass, etc. The user parking preferences data store 346 can also include information relating to whether the user's parking preferences are influenced by the weather. The user parking preferences data store 346 is accessed by the parking suggestions service 348 to rank available parking areas.

The parking suggestions service 348 accesses information from the parking area data store 350 and user parking preferences data store 346 to determine which parking areas are within a predefined area of a particular location. The parking suggestions service 348 operates in connection with the navigation application 304 to determine a destination to which a user is traveling. The parking suggestions service 348 also communicates with the parking data source 356 and the traffic data source 358 to determine which parking areas having vacant spaces available. In some embodiments, the parking suggestions service 348 accesses the weather data source 360 to determine if the parking area rankings needs to be modified based on weather conditions. A method of making parking suggestions that is performed by some embodiments of the parking suggestions service 348 is further described with respect to FIGS. 4-5.

The parking area data store 350 includes information about locations of various types of parking areas. Parking areas can include parking garages, parking ramps, parking lots, street parking, and other private parking areas. The parking area data store 350 also stores information about the characteristics of the parking areas such as: a number of spaces within the parking area, pricing and time of day of different pricing schedules, whether a business has free parking or validates parking, whether the parking is covered, the type of parking area, whether the parking has security, what types of payments the parking area will take, whether you need a pass to park somewhere, and whether the parking area is connected to indoor walkways such as covered skyways.

The parking data source 356 provides information about the availability of parking spaces within parking areas. In some embodiments, the parking data source 356 includes multiple data sources. For example, the parking data source 356 could access information from multiple parking facilities or multiple websites that have access to parking information. Such information can be accessed from parking facilities having sensors or other vacancy indicators that are connected to a network, such as the network 106.

The traffic data source 358 provides information about current traffic patterns. In some embodiments, the traffic data source 358 utilizes GPS data from multiple other vehicles to determine traffic patterns. In some embodiments, the traffic patterns are analyzed to determine if other drivers are avoiding one parking facility or are flocking to another parking facility. Trends in traffic can indicate whether parking spaces are vacant within one or more parking areas.

The weather data source 360 provides information about current and forecasted weather conditions for a particular location. In some embodiments, the weather data source 360 provides weather information for a user's destination. In other embodiments, the weather information pertains to the user's current location. In some embodiments, the weather data source 360 provides information to the parking suggestions service 348 if the user's parking preferences are influenced by weather. For example, a user may have a preference for heated parking garages, but only when the temperature is below freezing.

Figure 4:
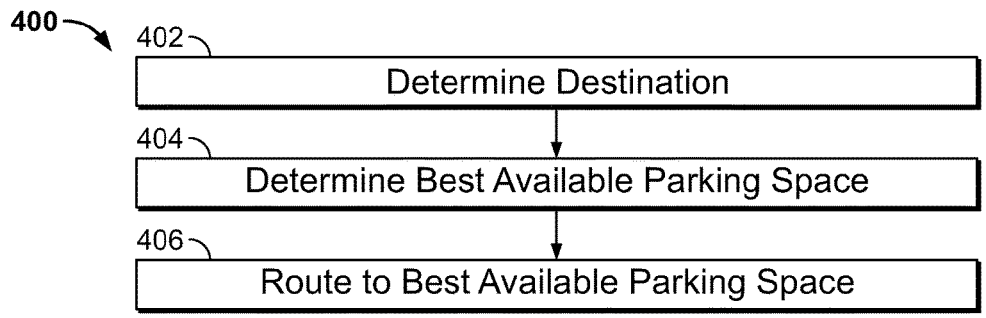
FIG. 4 illustrates an example method of navigating to a recommended parking area performed by some embodiments of the system of FIG. 1.

FIG. 4 illustrates an example method 400 of navigating to a recommended parking area performed by some embodiments of the system 100 of FIG. 1. At operation 402, a destination of the vehicle is determined. At operation 404, a best available parking space is determined. At operation 406, the vehicle is routed to the best available parking space.

Figure 5:
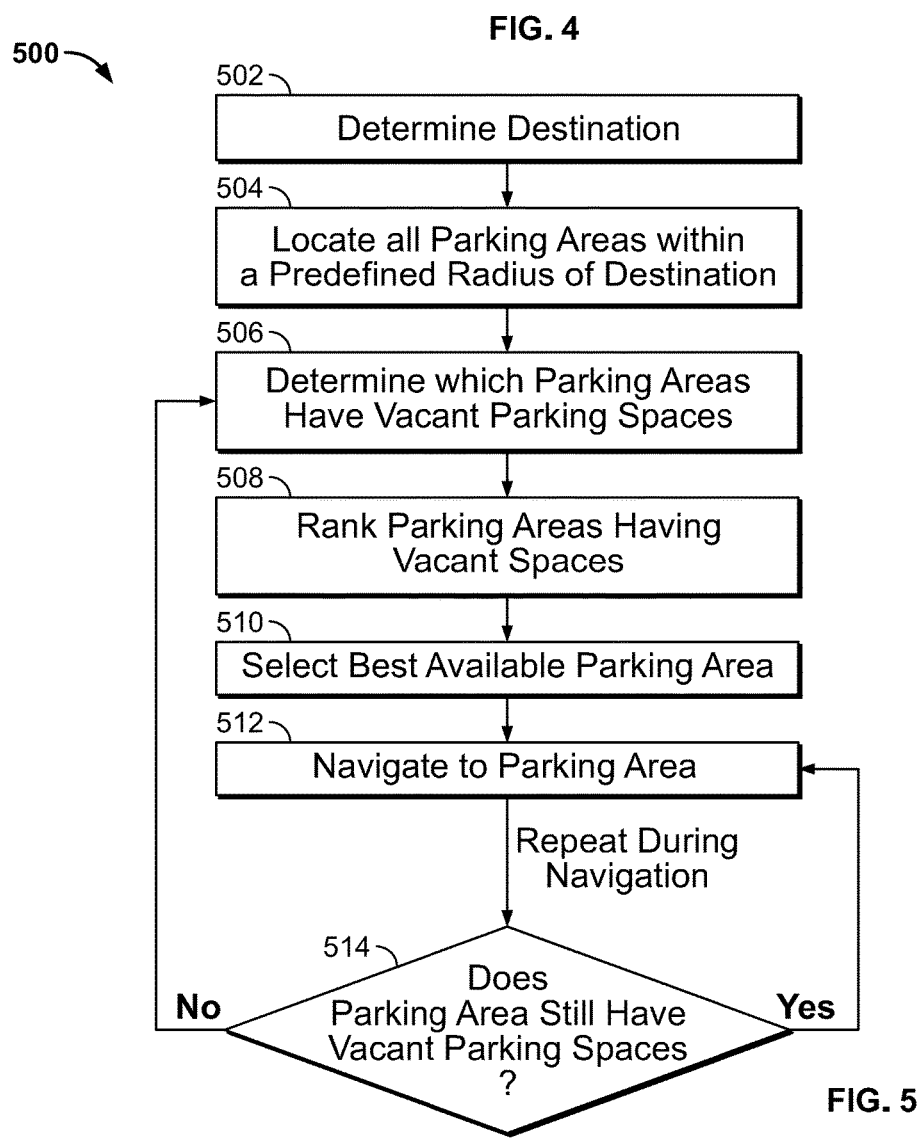
FIG. 5 illustrates another example method of navigating to a recommended parking area performed by some embodiments of the system of FIG. 1.

FIG. 5 illustrates another, more detailed, example method 500 of navigating to a recommended parking area performed by some embodiments of the system 100 of FIG. 1. At operation 502, a destination is determined. In one embodiment, the destination is an address, business, or landmark which a user has entered into the computing device 102. The user may have entered the destination into the computing device 102 before starting to travel so that the computing device could provide navigation instructions to the destination.

Alternatively, the user may already be traveling and wants to know if parking is available near his or her destination.

In another embodiment, the destination is the user's current location. For example, a user may be trying to find parking in a particular area and wants to know what the best available options are nearby. These embodiments are described further with respect to FIGS. 6 and 7.

In some embodiments, the computing device 102 automatically detects that the user is traveling to a particular destination. An example of this is shown in FIG. 8. Frequently traveled to destinations can be stored and accessed in the user navigation preferences data store 344. In some embodiments, machine learning is utilized to determine common routes of a user.

In some instances, the navigation service 342 accesses the user's calendar to determine where the user is travelling based on the date and time.

In some embodiments, the computing device 102 will automatically provide a parking suggestion for the user's destination and/or begin navigating to a parking area. In some embodiments, the computing device 102 will provide a parking report or prompt the user to determine if the user wants a parking recommendation. In some embodiments, the parking report or recommendation is only provided if the user's usual preferred parking area does not have vacant spaces and the user needs recommendations for an alternative place to park.

In some embodiments, the computing device 102 will also determine the length of time that the user needs to park. In some embodiments, the user simply enters the amount of time. In other embodiments, the length of time is determined based on accessing the user's calendar or by accessing GPS data of other vehicles to determine an average amount of time which most vehicles park at a particular destination.

At operation 504, all parking areas within a predefined distance of the destination are located. In some embodiments the predefined distance is measured as a straight-line distance from the destination, thereby being within a predefined radius from the destination. Parking areas are defined locations in which a vehicle can be legally parked. Parking areas can include parking lots, parking garages, parking ramps, street parking, driveways, metered parking, and other off-street parking. Parking facilities include managed or controlled parking areas such as parking garages, parking lots, and parking ramps having one or more common entrances and exits. In some embodiments, a parking area includes multiple parking spaces. In some instances, a parking area may only have one parking space. A parking space is defined as an area in which one vehicle can park, such as a metered parking space or a defined parking space within a parking lot or parking garage. In some instances, a parking space is a location along a street that is large enough to park a vehicle.

The predefined radius can be defined by a user, and the predefined radius can be saved in the user parking preferences data store 346. The predefined radius can also be automatically determined or set by default. In some embodiments, the predefined radius is from 0.1 to 5 miles, from 0.25 to 2 miles, or from 0.5 to 1 mile. In some embodiments, the predefined radius is a default radius of 1 mile. All parking areas within the predefined radius are located by accessing one or more parking data sources 356.

At operation 506, it is determined which parking areas have vacant parking spaces. As used herein, vacant parking spaces are areas in which a vehicle can be legally parked at a particular date and time, which is not currently occupied by a vehicle. In some embodiments, at least one vacant parking space must be present in the parking area. In other embodiments, user preferences may require that two or more vacant parking spaces must be vacant in order for a parking area to be considered to have available spaces. In other embodiments, probabilities of available parking are utilized to determine whether a parking area will be considered to have vacant spaces, even if there is not information provide an exact number of vacant spaces available.

In some embodiments, the system can determine which individual parking spaces are vacant. In such embodiments, an option may be available for the user to reserve an individual parking space.

There are multiple ways in which the availability of parking spaces can be determined. In one embodiment, vacant parking spaces are determined in controlled parking facilities by accessing data from the parking facility server that indicates the number of vehicles in the parking facility compared to the number of available parking spaces. For example, a parking garage may have 300 possible parking spaces and data from the server indicates that 297 vehicles have entered the parking facility while only two vehicles have exited the parking facility. Data from the parking facility indicates that there are 5 available parking spaces in the parking facility. Parking facility data can be accessed from one or more parking data sources 356. Such data sources can be parking sensors, parking facility gate monitors, websites monitoring parking availability in various parking facilities, and other networked sources of parking data.

In another embodiment, vacant parking spaces are determined by inferring the availability of parking based on the GPS movements of other vehicles. In this embodiment, data is accessed from traffic data sources 358 indicating the movements of vehicles based on satellite information. If multiple vehicles are entering a parking area and are remaining in the parking area for a long enough period of time to indicate that the vehicle has been parked, the data will indicate that additional parking spaces are likely to be vacant within that parking area. If, on the other hand, vehicles are entering and then immediately exiting a parking area, this indicates that the parking area is full and does not have vacant spots. If multiple vehicles are traveling to the parking area and then leaving for another parking area, this indicates that it is unlikely that there are parking spots available within the parking area.

In another embodiment, other sources of data are accessed to determine if parking spaces are vacant. For example, in some instances, parking meters are equipped with sensors that communicate with a server. These parking meters can report if a vehicle is present in a parking space and whether a fee has been paid for the parked vehicle. This data can be accessed from one or more parking data sources 356 and utilized to determine if spaces are vacant. Metered parking spaces are typically found along streets, but could also be located within parking lots or parking garages.

In some embodiments, operation 506 takes into account the probability that a parking space will be vacant by the time a user arrives at the parking space. For example, a parking space could be vacant while the user is navigating towards a destination, but after driving for 20 minutes, that parking space could become occupied by another vehicle. Similarly, a parking facility may be full when a user leaves for a destination, but vacant spaces may become available by the time the user nears the destination. Parking data sources 356 can be accessed intermittently to determine if parking spaces are still vacant. Additionally, the parking suggestions service 348 can analyze traffic patterns and current parking availability for a given time to determine a probability that a given parking area will have vacant parking spaces when a user arrives at the parking area.

At operation 508, the parking areas having vacant spaces are ranked. The parking areas may be automatically ranked or may be ranked based on user defined preferences. In some embodiments, the parking areas are simply ranked by distance from destination, cost of parking, or a combination of distance and cost. In some embodiments, ranking the parking areas by distance and cost is the default ranking system.

In some embodiments, users can define preferences for choosing parking areas. For example, a user may be trying to save money and is willing to walk further to the destination to reduce parking fees. In another example, a user may be willing to pay more to have covered parking during the winter. In another example, a user may only wish to consider parking areas that accept prepaid parking cards for payment. An example of selecting parking preferences is described with respect to FIG. 11.

In some embodiments, parking preferences can be learned from a user's past parking behavior or by referencing the preferences of similar users. For example, if the user drives downtown every day to go to work at approximately 8:00 am every day, the preferences of other users traveling to downtown at approximately 8:00 am may be referenced to determine which parking areas are the best for the user's given destination.

In another example, if a user always parks in the same parking garage when traveling to a particular destination, the system will learn that the particular parking garage is the user's preferred parking area and will rank that parking garage highest. If the parking garage does not have vacant spaces, the system will suggest a next best available parking space.

In some embodiments, the ranked parking areas are displayed for a user, for example, on a display of a computing device such as the computing device 102 of FIG. 1. In such embodiments, the user can select which parking area to navigate to, even if the parking area is not the top ranked parking area. The system can learn the user's preferences by recording these selections in the user parking preferences data store 346. An example of such a display is shown and described in FIG. 15.

At operation 510, the best available parking area is selected. In some embodiments, the top ranked parking area having vacant spaces is automatically selected. In other embodiments, the user may select the best available parking area from the top ranked choices. In such embodiments, the selection may be made by touching a touch-screen or by issuing a voice command.

At operation 512, the user and vehicle are routed to the selected parking area. Navigation instructions are provided by the navigation service 342. Turn-by-turn navigation instructions are provided to an entrance of the selected parking area. In some embodiments, the user is navigated to a particular vacant parking space.

Throughout the time that the vehicle is navigating to the parking area, the system may initiate operation 514 to determine if the selected parking area still has vacant parking spaces. In some embodiments, operation 514 is initiated periodically to ensure that the selected parking area is still available. In some embodiments, the parking area is continually monitored. If the parking area still has vacant parking spaces, the method 500 proceeds with navigating to the selected parking area.

In some embodiments, a variation of operation 514 may be implemented to determine if better parking has become available while the user has been navigating to the destination and selected parking area. For example, a user may have been navigating to a parking garage 0.25 miles away from his or her destination that was going to charge $10 for parking. As the user is approaching the destination, the parking suggestions service 348 detects that a space has become vacant on the street 0.1 miles from the destination that will only cost $1.50. The computing device 102 can present a prompt on the user interface 112 asking the user if he or she wishes to navigate to the newly found better parking space. In other embodiments, the navigation service 342 can automatically initiate rerouting to the better parking space.

If it is determined in operation 514 that the parking area no longer has vacant parking spaces, the method 500 returns to operation 506 to determine which other parking areas still have vacant parking spaces. A new best available parking area is selected at operation 510 and the method 500 again proceeds to navigate the user to the best available parking area at operation 512.

Figure 6:
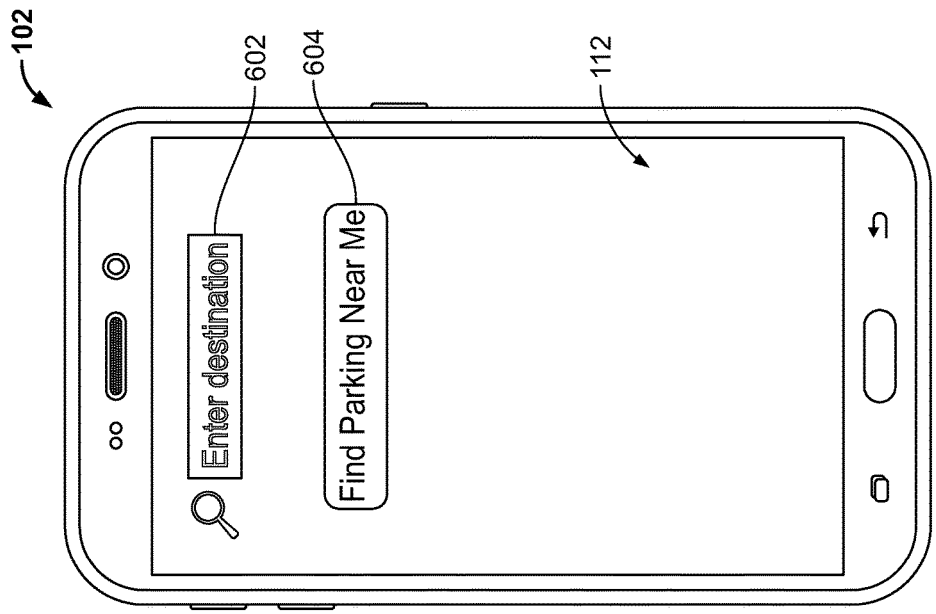
FIG. 6 illustrates an embodiment of the user interface displayed on the computing device of FIG. 2 implementing the method of FIG. 5.

FIG. 6 illustrates an embodiment of the user interface 112 displayed on the computing device 102 of FIG. 2. In this view, the user interface 112 displays one example of determining a destination, as described in operation 502 of the method 500 of FIG. 5. A search field 602 is displayed, in which a user can enter a destination. In some embodiments, the destination is entered as text using, for example, a touch-screen keyboard. In some embodiments, the destination can be entered by speaking a destination. The destination can be an address, GPS coordinates, the name of a business, or other location identifier.

Also shown is a button 604 reading "Find Parking Near Me." In some embodiments, the user's current location is used as the destination and the best available parking to the user's current location is determined.

Figure 7:
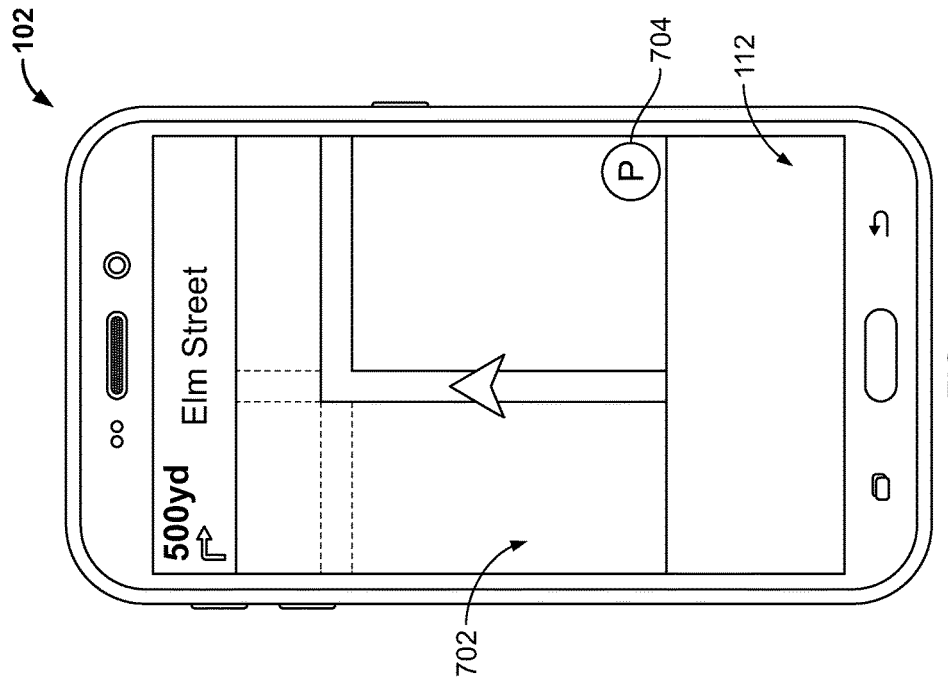
FIG. 7 illustrates another embodiment of the user interface of the computing device of FIG. 2 implementing the method of FIG. 5.

FIG. 7 illustrates another embodiment of the user interface 112 implementing an embodiment of operation 502 of the method 500 of FIG. 5. In this embodiment, the user interface 112 is displaying a map 702 showing that the computing device 102 is providing navigation instructions to the user. A parking icon 704 is displayed. By selecting the parking icon 704, the computing device 102 is prompted to locate parking areas near the destination to which the user is currently navigating. In some embodiments, the user may not have entered a destination, but is operating the navigation features of the computing device 102 to follow the current location of the vehicle. In such embodiments, the user could select the parking icon 704 to find parking near the user's current location.

FIG. 8 illustrates yet another embodiment of the user interface 112 implementing an embodiment of operation 502 of the method 500 of FIG. 5. In this embodiment, the computing device 102 is operating the navigation service 342, but is not actively navigating the user to a particular destination. However, the system has determined, based on previous activity of the user, that the user is travelling to his or her workplace. In this example, a message 802 has appeared reading, "You seem to be headed to WORK. Navigate to Best Available Parking near WORK?" The user can elect to navigate to the best available parking area by making a selection on the screen or providing a voice command. Alternatively, the user can dismiss the message. In some embodiments, the parking suggestions service 348 will only prompt the user to navigate to a parking area if the user's preferred parking area does not have vacant spaces. If the user commands the system to navigate to the best available parking, the method 500 described in FIG. 5 proceeds to operation 504.

FIG. 9 is a map visualization 900 of a portion of a city used in the method 500. In this view, a destination is marked with a location marker 902. Also shown are parking facilities 904 and street parking indicators 906. Parking facilities 904 may include one or more of parking garages, parking ramps, and parking lots. The street parking indicators 906 are shown as diagonal lines where street parking is available. In some instances the street parking is free and in other instances the street parking is regulated with parking meters. In some embodiments, street parking has parking meters that are only enforced during certain times of day.

The map visualization 900 depicts an example of the result of operation 504 of the method 500 of FIG. 5. In this example, all possible parking areas within a predefined radius are shown. In some embodiments, this visualization 900 is not displayed for the user during operation of the method 500. The map visualization 900 in FIG. 9 is displaying all parking areas within the radius, even if occupied by vehicles or inaccessible by the user.

As was described with respect to FIG. 5, there are multiple possible ways to determine if parking spaces are vacant. One or more ways can be utilized at once. FIGS. 10-13 represent three such methods.

Figure 10:
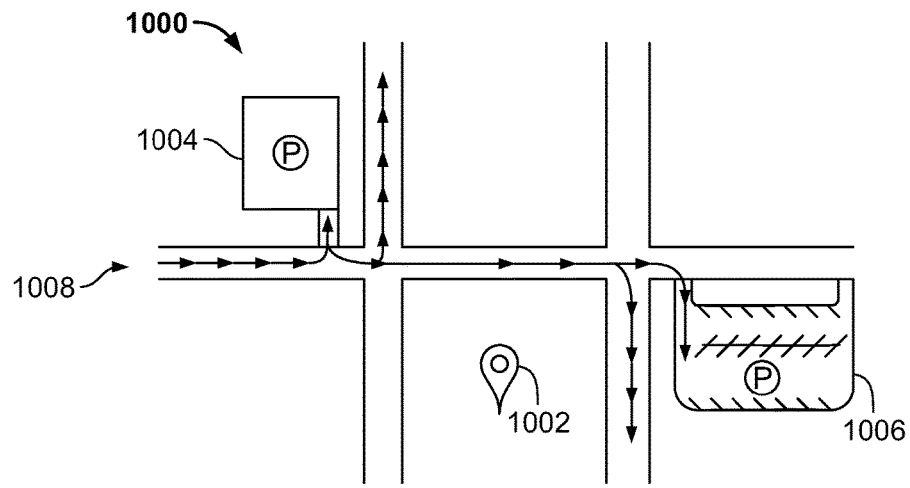
FIG. 10 depicts a visualization of one embodiment of the method of FIG. 5.

FIG. 10 depicts a visualization 1000 of one embodiment of operation 506 of the method 500. In this embodiment, vacant parking spaces are determined based on the GPS movements of other vehicles. The traffic patterns of other vehicles are accessed from the traffic data source 358 and are analyzed to infer whether parking spaces are vacant in particular parking areas.

In the example depicted in the visualization 1000 of FIG. 10, a location marker 1002 indicates the destination to which a user is navigating. A parking garage 1004 and a parking lot 1006 are shown near the location marker 1002. Traffic patterns 1008 are shown with directional arrows indicating the flow of other vehicles. In this example, the traffic patterns 1008 show that many vehicles are entering and then immediately exiting the parking garage 1004. The vehicles then branch off in different directions, but many vehicles travel to the parking lot 1006. The system can analyze these traffic patterns to deduce that the parking garage 1004 is likely lacking in vacant parking spaces, but that the parking lot 1006 has vacant spaces because the traffic patterns 1008 do not show traffic leaving the parking lot 1006. The more traffic that is diverting to another parking area, the less likely it is that the original parking area has vacant spaces. Based on this analysis, the computing device 102 can indicate to the user to navigate to the parking lot 1006 instead of the parking garage 1004.

The visualization of FIG. 10 is also applicable to checking to see if a parking area still has available parking spaces, according to operation 514 of the method 500. Perhaps the user was initially travelling to the parking garage 1004, but receives a notification to travel instead to the parking lot 1006 due to the system analyzing the traffic patterns and deducing that the parking garage 1004 was now full.

Figure 11:
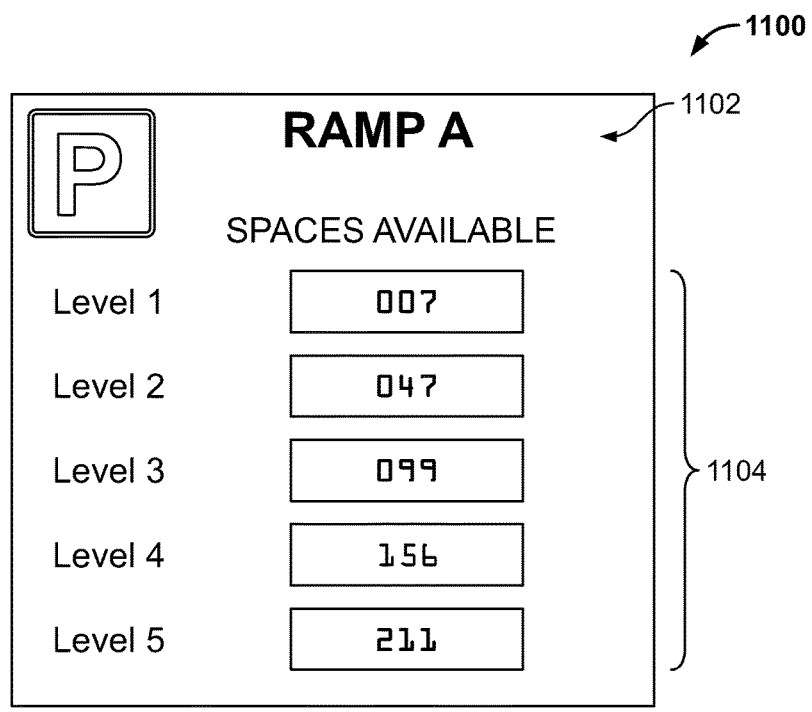
FIG. 11 illustrates an example display used in an embodiment of the method of FIG. 5.

FIG. 11 illustrates an example display 1100 of parking availability for a parking ramp. In one embodiment, the computing device 102 accesses external data relating to parking availability in a parking facility obtained from the parking data source 356. In the example of FIG. 11, a display 1100 shows the number of spaces available 1104 in Ramp A 1102. This is just one example of a source of data for parking availability in a parking facility. Multiple parking facilities can be referenced by the parking data source 358. Various information can be provided by the parking facilities including the number of vacant spaces or simply whether the facility is full or not.

Figure 12:
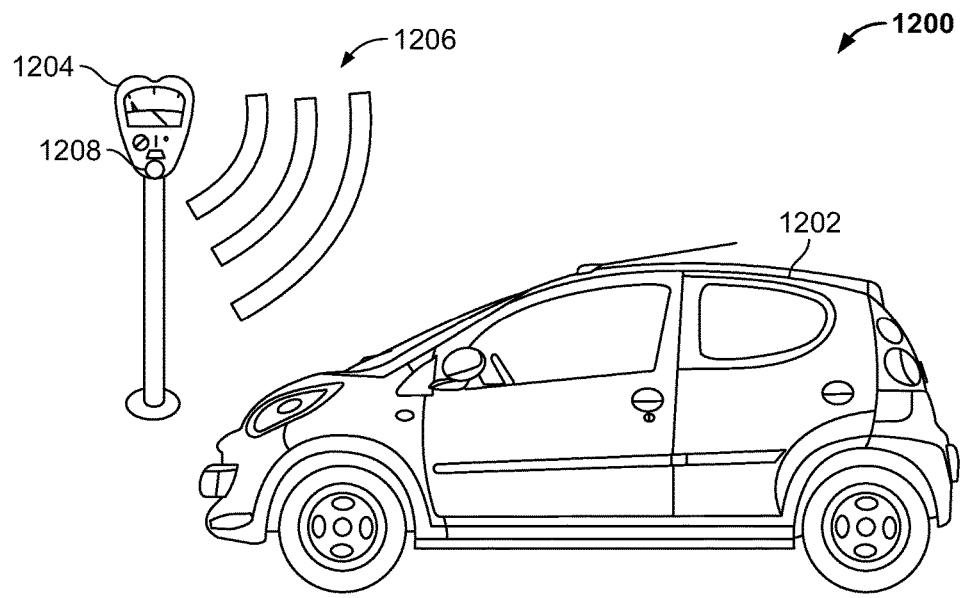
FIG. 12 illustrates an example illustration of an embodiment of the method of FIG. 5.

FIG. 12 illustrates another example version of operation 506 for determining which parking areas have vacant parking spaces. A vehicle 1202 is parked at a parking meter 1204. The parking meter 1204 has a sensor 1208 that can detect the presence of a vehicle. In some embodiments, the sensor utilizes ultrasonic or sonar waves 1206 to detect the presence of a vehicle. Other sensors can include a weight sensor underneath the parking space or use of cameras.

In one embodiment, the computing device 102 can access the parking data source to access information from parking meters such as the parking meter 1204 in FIG. 12 and determine if parking spaces are vacant. In some embodiments, the parking information indicates whether the parking meter is expired and what time the parking meter expired. In some embodiments, the parking information indicates whether a vehicle is present in the space or, if vacant, what time the space became vacant.

Figure 13:
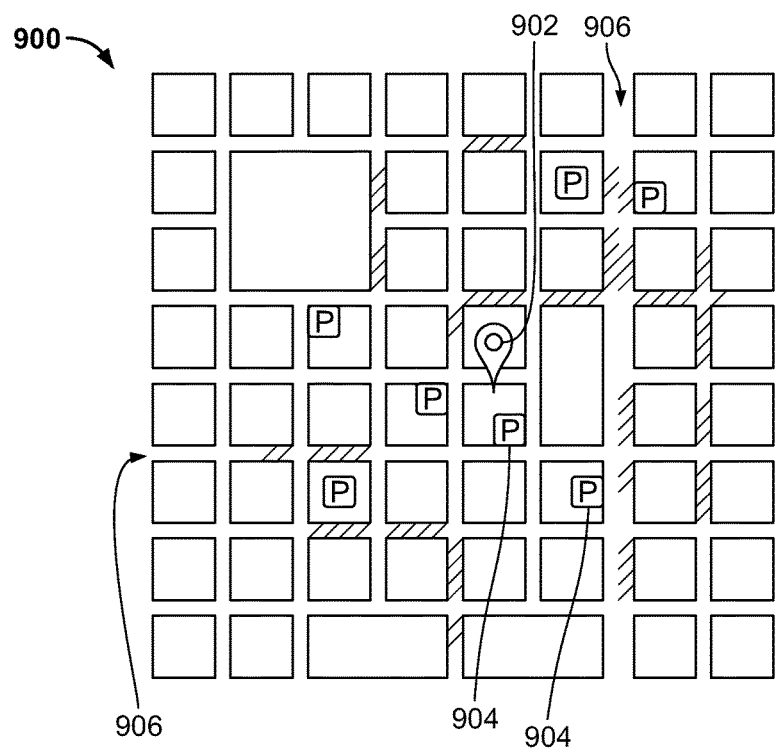
FIG. 13 shows another view of the map visualization used in an embodiment of the method of FIG. 5.

FIG. 13 shows the map visualization 900 displaying the parking areas that have vacant spaces near the user's destination 902. Parking facilities 904 and street parking indicators 906 show where there is available parking. The map visualization 900 in FIG. 13 illustrates an example embodiment of the operation 506 of the method 500 of FIG. 5. Generally, fewer parking areas will be displayed here than in FIG. 9 because some parking areas will not have vacant spaces. Next, the parking areas are ranked according to operation 508, for instance according to user defined preferences.

FIG. 14 illustrates an example display 1400 of parking preferences that could be displayed on the computing device 102 of FIG. 1. The user could access the parking preferences on the user interface 112 and adjust the parking preferences which determines the way in which available parking spaces are ranked. In some embodiments, user defined preferences determine the ranking of parking areas having vacant spaces, as described in operation 508 of the method 500 of FIG. 5. In alternative embodiments, parking areas are ranked by one or more of distance and cost, based on preferences of the user determined by machine learning, or by analyzing the parking behavior of other users.

The display 1400 includes a series of sliders 1402, 1404, 1406, 1408 and selectors 1410, 1412 that can be adjusted for various parking parameters. Other methods of displaying and receiving selections from a user are possible, such as radio buttons, drop-down menus, and the like. In some embodiments, the sliders and selectors are interdependent, such that moving one slider automatically moves another slider. For example, sliding the cost slider 1404 to select free parking may restrict the distance slider 1402 such that a user cannot select the shortest distance.

The distance from destination slider 1402 can be adjusted to indicate a user's preference for how far from a destination the user is willing to park. In the example of FIG. 14, the slider 1402 indicates selections for "As close as possible!" to indicate a desire to not park very far away, such as less than 0.2 miles. There is a selector labeled "I love walking!" which indicates that the user is willing to park a long distance (over 1 mile) from the destination if needed. By default, the slider could be set at "Within reason" which indicates that the user will be willing to park up to 0.5 miles away from the destination to satisfy other criteria.

The cost of parking slider 1404 shows selections for "Better be Free!," "Within Reason," and "Money is no object." A user might select "Better be Free!" if he or she does not ever want to pay for parking. A user might select "Money is no object" if other factors are more important for parking, such as distance or availability of covered parking.

The covered parking slider 1406 can be adjusted based on the user's preference for covered parking. Covered parking can include underground parking garages, levels of an above-ground parking garage that are covered, and covered parking lots. In the example of FIG. 14, the slider 1406 can be adjusted between "not important," "preferably, but not essential," and "must have" based on how important covered parking options are to the user. In some embodiments, a user can indicate that covered parking is only important during certain types of weather.

The secured parking slider 1408 can be adjusted based on the user's preference for secured parking. Secured parking can include parking garages and lots having a security guard on duty, secured exits and entrances, and other measures to limit access to the vehicles within the parking area. In the example of FIG. 14, the slider 1408 can be adjusted between "not important," "preferably, but not essential," and "must have" based on how important secured parking options are to the user.

The payment method selector 1410 displays options for types of payments that are accepted by the parking areas. In this example, the options include cash, credit card, and city prepaid parking card. The user can select which payment options he or she prefers to use for parking facilities. In the example of FIG. 14, the selector 1410 for "credit card" has been selected. This will limit the displayed parking areas to those that accept credit cards as payment for parking. The system can determine which payment types are accepted at various parking facilities by accessing the parking data source 356 and/or the parking area data store 350.

The accessibility selector 1412 allows a user to indicate if he or she has a permit or pass to park in particular facilities or types of parking spaces. For example, in FIG. 14, an option is shown for entering a parking pass for a particular parking facility. Also shown is an option to select that the user has a disability parking certificate. Other types of passes and permits are possible such as parking for pregnant women, parking passes for residents of a gated community or apartment complex, or an employee parking permit.

Other options for parking preferences are possible. Various combinations of preferences can be displayed, selected, and combined together based on user input and/or automatic selection. For example, a user could also indicate a preference for heated parking facilities, parking facilities connected through an indoor walkway to the user's destination, parking spaces on a particular floor, etc.

Figures 15, 16:
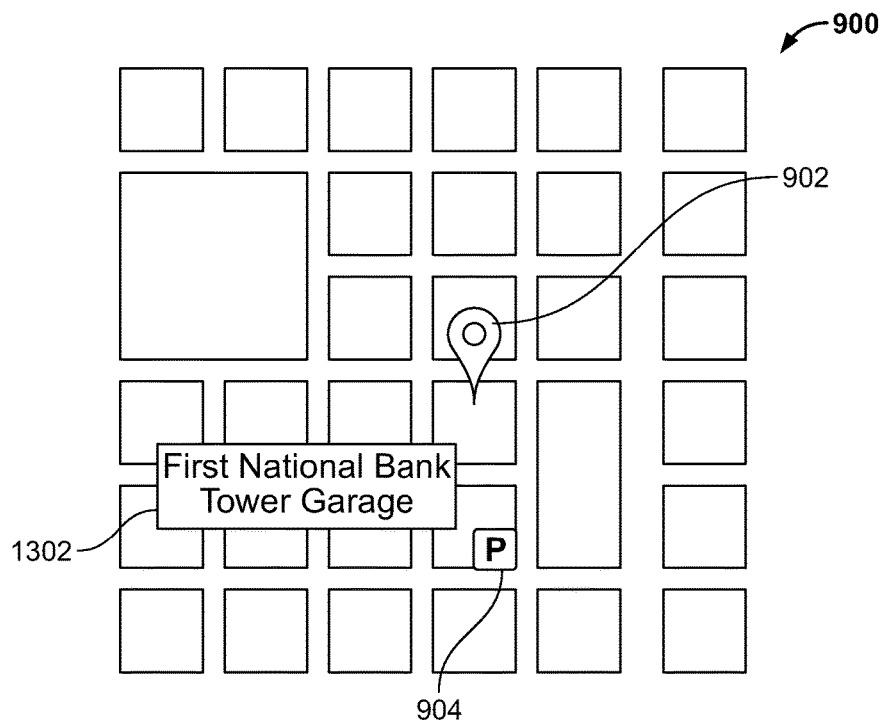
FIG. 15 illustrates an example display of ranked parking areas displayed on the computing device of FIG. 1.
FIG. 16 shows an example display of a selected parking area according to an embodiment of the method of FIG. 5.

FIG. 15 illustrates an example display 1500 of ranked parking areas. In some embodiments, the ranked parking areas are displayed for the user to select from. In other embodiments, the ranked parking areas are not displayed for the user, and the best available parking area is automatically selected. The top ranked parking areas 1502 are displayed in order of best matches to the user's preferences. In the example of FIG. 15, the parking areas are ranked by percent match 1504 to the user's preferences. The match is determined by how well the parking areas align with the preferences selected by the user, as shown in FIG. 14. In other embodiments, the ranking could be based on other calculations or how well the parking areas match automatically set preferences. In embodiments where the rankings are displayed to a user, the rankings can include displays of one or more of distance from destination and cost of parking.

In the example of FIG. 15, First National Bank Tower Garage is the best available parking area with a match percentage of 99%. In some embodiments, the First National Bank Tower Garage will automatically be selected as the best available parking area and navigation will start. In other embodiments, the user may select to navigate to the First National Bank Tower Garage. The user could also decide that he or she prefers a different parking option and selects to navigate to a different parking area.

FIG. 16 shows an example display of a selected parking area according to an embodiment of the method 500 of FIG. 5. The selected parking area 1302 (First National Bank Tower Garage) is shown on the map 900. The user's destination 902 is shown along with a parking facility indicator 904. The name of the best available parking area 1302 is also displayed. In some embodiments, this display is not shown to the user and the screen immediately starts to display navigation instructions to the best available parking area. FIG. 16 displays an example of operation 510 of the method 500 of FIG. 5.

FIG. 17 shows an example display on the user interface 112 of the computing device 102. The display shows an example embodiment of operation 512 of the method 500 of FIG. 5. The display shows a map 1700 of the navigation system and a message 1702 stating "Navigating to First National Bank Tower Garage." The computing device 102 will then provide turn-by-turn navigation instructions to the user through the user interface 112. The instructions can include both visual and audial guidance.

FIG. 18 shows an example embodiment of operation 514 of the method 500 of FIG. 5. In the example of FIG. 18, the system has determined that the First National Bank Tower Garage no longer has vacant spaces. In this example, the computing device 102 automatically selects the next best available parking area. The user interface 112 shows a new message 1702 stating "First National Bank Tower Garage is Full. Rerouting to 6$^{th}$ Ave Paid Lot." It was indicated in FIG. 15 that the 6$^{th}$ Ave Paid Lot was the next best available parking area, matching the user's preferences at 97%. The navigation system will now route the user to the next best available parking at the 6$^{th}$ Ave Paid Lot.

FIG. 19 shows an alternative embodiment of rerouting to a different parking area during navigation. In the view displayed on the user interface 112 in this example, the user had previously indicated a desire to park in covered parking areas when it is raining. While navigating to the surface parking lot, 6$^{th}$ Ave Paid Lot, the parking suggestions service 348 received information from the weather data source 360 indicating that precipitation is falling in the area of the user's destination. The user is then directed to the best available parking area that is covered, in accordance with the user's preferences. In the example of FIG. 19, the next best available parking area is the Public Parking Ramp A.

FIG. 20 shows another example display on the user interface 112. In this example, the system has indicated that the user's destination has validates parking in a nearby parking facility. In the example of FIG. 20, the destination 2002 is Andre's Bistro. The system accessed the parking area data store 350 to determine that parking at Walnut Street Garage 2004 is validated by Andre's Bistro. In some embodiments, the user can opt to not navigate to the recommended parking area and return to the method 500 of FIG. 15 to find the best available parking. In other embodiments, the system will automatically begin to navigate the user to the recommended validated parking that is available for the business, as shown in FIG. 21.

Figure 21:
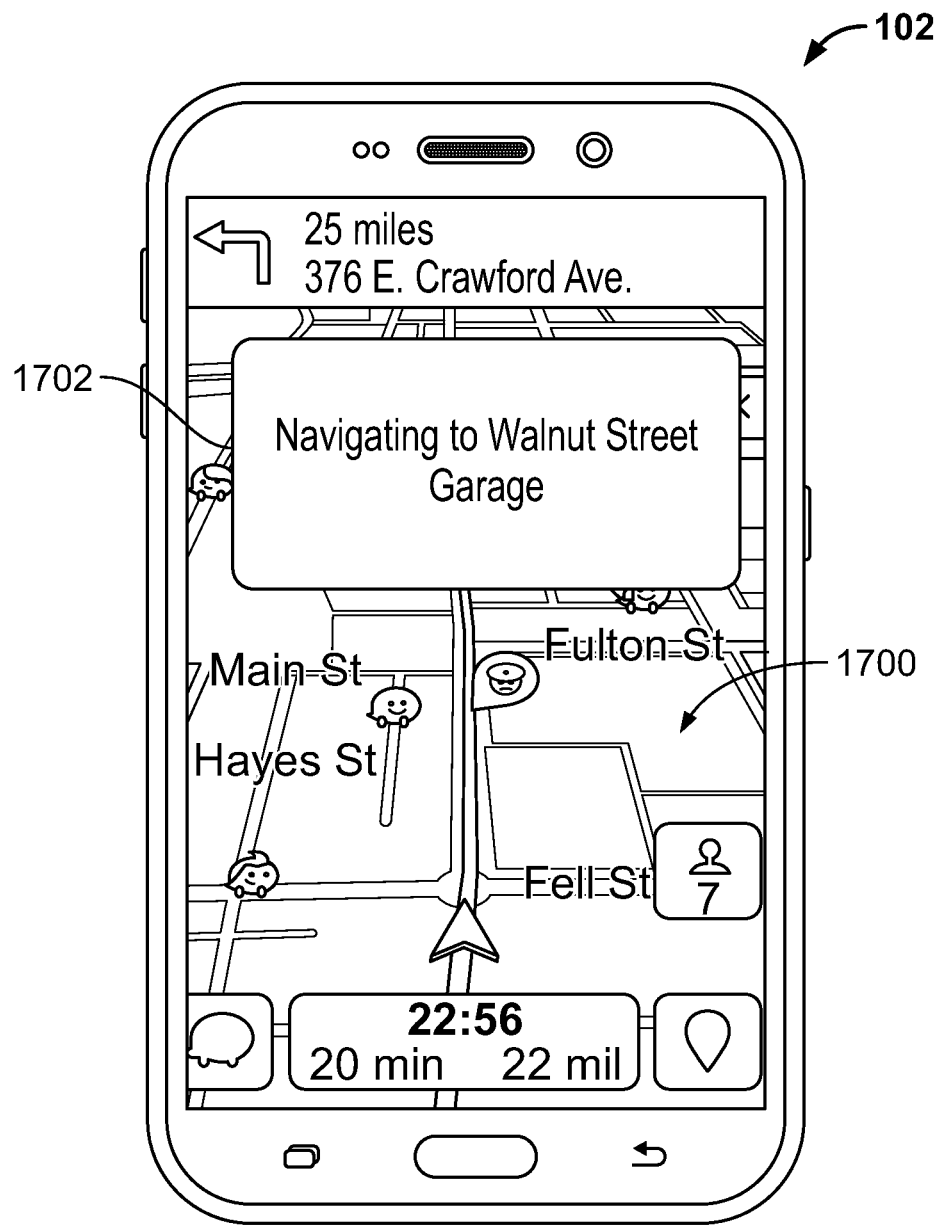
FIG. 21 shows another example display on the interface of the computing device of FIG. 2.

FIG. 21 shows an example display of the user interface 112 showing the map 1700 of a navigation service and a message 1702 indicating that the user is now navigating to the Walnut Street Garage.

Various other features can be integrated with the computing device 102 described herein. For example, the computing device 102 could provide alerts to the user when the user's preferred parking area does not have vacant spaces or if better parking has become available during navigation to a destination. A daily parking report for a user's daily commute could be provided as the user is nearing the destination. In some embodiments, a weather report is also included. In some embodiments, the reports and alerts are provided at times when they are least likely to interrupt the media content that the user is listening to through the computing device 102.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of navigating a vehicle to a parking space using a computing device, the method comprising:
    determining a set of user parking preferences for a user associated with the computing device wherein the user parking preferences define how important each of a plurality of parking area characteristics are to the user;
    determining a destination;
    determining a best available parking space by:
        locating parking areas within a predefined distance of the destination having vacant parking spaces; and
        ranking the parking areas based on how well the parking areas having vacant spaces match the user parking preferences; and
    routing the vehicle to the best available parking space.

2. The method of claim 1, wherein determining a destination comprises receiving input through a user interface from a user in the vehicle, the input specifying the destination.

3. The method of claim 1, wherein determining a destination comprises:
    accessing one or more preferences of a user in the vehicle;
    determining a current location of the vehicle; and
    determining, based on the one or more preferences and the current location, the destination.

4. The method of claim 1, wherein determining a destination comprises receiving input from a user to find nearby parking and determining a current location of the vehicle.

5. The method of claim 1, wherein the predefined distance is a radius between 0.25 miles and 2 miles.

6. The method of claim 1, wherein vacant parking spaces are located by accessing one or more of GPS data of other vehicles, parking availability data from parking facilities with sensors, and meter data of street spaces.

7. The method of claim 1, wherein the user preferences comprise at least distance of parking area from destination and one or more of: cost of parking, availability of covered parking, availability of secured parking, payment type accepted, and applicability of a parking pass.

8. The method of claim 7, wherein the user preferences further comprise parking in a particular type of parking space when a particular type of weather is occurring.

9. The method of claim 7, wherein the user preferences are selected by the user.

10. The method of claim 7, wherein the user preferences are automatically selected to match the parking behavior of other users traveling to the same destination.

11. The method of claim 1, wherein ranking comprises ordering the parking areas based on how closely the parking areas match the user preferences.

12. The method of claim 1, wherein ranking comprises presenting free parking provided by the destination as the best available parking option.

13. The method of claim 1, wherein routing the vehicle to the best available parking space further comprises checking to determine whether the selected parking area is still available during navigation and rerouting the vehicle to the next best available parking space if the best available parking space is no longer available.

14. The method of claim 1, wherein routing the vehicle to the best available parking space further comprises checking to determine whether a better parking space has become available during navigation and rerouting the vehicle to the better available parking space.

15. A computing device for navigating a vehicle to a parking space, the computing device comprising:
    a processor;
    a location determining device;
    an output device configured to play media content items during navigation; and
    a memory device encoding instructions that, when executed by the processor cause the computing device to:
        determine a set of user parking preferences for a user associated with the computing device wherein the user parking preferences define how important each of a plurality of parking area characteristics are to the user;
        determine a destination;
        determine a best available parking space by:
            locating all parking areas within a predefined distance of the destination;
            determining which parking areas have vacant parking spaces;
            ranking the parking areas based on how well the parking areas having vacant spaces match the user parking preferences;
            selecting a parking area; and
        route the vehicle to the best available parking space.

16. The computing device of claim 15, further comprising a user interface for receiving input from a user, wherein the user interface receives input from the user by one or more of a sound-sensing device and a touch screen.

17. The computing device of claim 15, wherein the best available parking space is determined by ranking the parking areas based on distance from destination and one or more of: availability of covered parking, availability of secured parking, payment type accepted, applicability of parking pass, and cost of parking.

18. The computing device of claim 15, further comprising a network access device configured to access external data sources to determine which parking areas have vacant parking spaces.

19. The computing device of claim 18, wherein the external data source includes GPS data for other vehicles indicating whether the vehicles are entering or leaving parking areas.

20. A system for navigating a vehicle to a parking space comprising:
 a media server configured to communicate with a media playback device through a network, the media server comprising:
  a media server application for accessing and streaming media content;
  a parking application for determining a best available parking area;
  a navigation application for determining a route of the vehicle;
  a processing device; and
  a memory device encoding instructions that, when executed by the processor, cause the media server to:
   determine a set of user parking preferences for a user associated with the media playback device, wherein the user parking preferences define how important each of plurality of parking area characteristics are to the user;
   receive a selection of a destination;
   determine a best available parking space for the destination based on how well the parking areas match the user parking preferences; and
   send instructions to the media playback device to route the vehicle to the best available parking space.

21. The system of claim 20, wherein the media playback device comprises:
 a processor;
 a location determining device;
 an output device configured to play media content items during navigation and present a user interface, the media content items comprising at least audio content; and
 a memory device encoding instructions that, when executed by the processor cause the media playback device to:
  present the user interface to a user, the user interface configured to facilitate interaction between the user and the media playback device to navigate the vehicle, receive parking recommendations, and play media content items;
  send a location of the media playback device to the media server;
  receive instructions routing the vehicle to the best available parking space; and
  play media content.

22. The system of claim 20, wherein the best available parking space is determined by finding a vacant parking space that best matches one or more user parking preferences comprising at least distance of parking area from destination and one or more of: cost of parking, availability of covered parking, availability of secured parking, payment type accepted, and applicability of parking pass.

23. The system of claim 20, wherein the memory device further encodes instructions that, when executed by the processor cause the media server to issue an alert to the media playback device, wherein the alert includes parking availability information.

24. One or more computer-readable media having computer-executable instructions embodied thereon that, when executed by one or more computing devices, cause the computing device to:
 receive input of a destination;
 locate all parking areas within a predefined distance of the destination;
 determine which parking areas have vacant parking spaces by accessing one or more of parking facility data, parking meter data, and GPS data of other vehicles;
 rank vacant parking spaces based on user parking preferences the user parking preferences defining how important each of a plurality of parking area characteristics are to the user;
 select the best available parking space based on the user parking preferences; and
 provide navigation instructions to the best available parking space.

25. The computer-readable media of claim 24, wherein the computer-executable instructions further cause the computing device to intermittently check to determine whether the best available parking space is still vacant, and if the best available parking space is no longer vacant, to determine a next best available parking space and provide navigation instructions to the next best available parking space.

26. The computer-readable media of claim 24, wherein the computer-executable instructions further cause the computing device to intermittently check to determine whether a better parking space has become available, and if a better parking space has become available, to provide navigation instructions to the better parking space.

27. The computer-readable media of claim 24, wherein user defined preferences include a preference for parking in a particular type of parking space when a particular type of weather is occurring.

* * * * *